356-150
SEARCH ROOM

Sept. 21, 1965 A. HEINZ 3,207,904

ELECTRO-OPTICAL ARTICLE POSTITIONING SYSTEM

Filed April 9, 1962 3 Sheets-Sheet 1

INVENTOR.
A. HEINZ
BY
H. J. Winegar
ATTORNEY

356/150

Sept. 21, 1965 A. HEINZ 3,207,904

ELECTRO-OPTICAL ARTICLE POSTITIONING SYSTEM

Filed April 9, 1962 3 Sheets-Sheet 2

INVENTOR.
A. HEINZ

BY

H. J. Winegar

ATTORNEY

ELECTRO-OPTICAL ARTICLE POSTITIONING SYSTEM

Filed April 9, 1962 3 Sheets-Sheet 3

INVENTOR.
A. HEINZ
BY
H. J. Winegar
ATTORNEY

United States Patent Office 3,207,904

Patented Sept. 21, 1965

3,207,904
ELECTRO-OPTICAL ARTICLE POSITIONING SYSTEM

Alfred Heinz, Flemington, N.J., assignor to Western Electric Company, Incorporated, New York, N.Y., a corporation of New York Filed Apr. 9, 1962, Ser. No. 186,127
7 Claims. (Cl. 250—202)

This invention relates to an electro-optical article positioning system and in particular to an electro-optical system capable of providing both translational and rotational positioning of an article.

In many fields of industry accurate positioning of small articles is required before a manufacturing step may be performed. This is particularly true in the electronics industry where, for example, the bonding of conductive leads to a semiconductor wafer during the production of transistors requires a critical positioning of the electrodes, called contact stripes, which may be typically 2 mils by 4 mils in size, with respect to the bonding apparatus. In manual manufacture, the wafer is viewed through a microscope and the operator manipulates mechanical positioning apparatus to translate and rotate the wafer into its proper orientation.

In order to automate the manufacture of transistors, applicant disclosed in application Serial No. 843,960, filed October 2, 1959 and issued April 10, 1962 as Patent 3,029,348, an electro-optical servo system for providing tranlational positioning ( Xand Y axes orientation) of articles. While this system is a substantial advance in the art, to enable a many fold increase in the speed of manufacture in transistors, it is still necessary to manually rotate the wafers.

Accordingly, it is an object of this invention to provide a new and improved electro-optical article positioning system.

Another object of this invention is to provide an electro-optical system capable of providing rotational positioning of an article.

A further object of this invention is to provide a positioning system capable of simultaneously translating and rotating a small article, such as a semiconductor wafer, into proper orientation.

An electro-optical system for positioning a body which contrasts with its background illustrative of certain features of the invention may include at least four light masking means, a light sensitive electrical element individual to each masking means, mixing means, means for comparing the outputs of the mixing means, and means for rotating the body in response to the output of the comparing means. The masking means are so designed that each one permits only light from a portion of one quadrant of the optical field to reach its associated light sensitive element. The mixing means add the outputs of the elements which receive light from diagonally opposite quadrants of the optical field.

The system may include additional mixing means for adding the outputs of elements receiving light from adjacent quadrants. The additional mixing means supply additional comparing means, which in turn supply translational positioning information.

Figure 1:
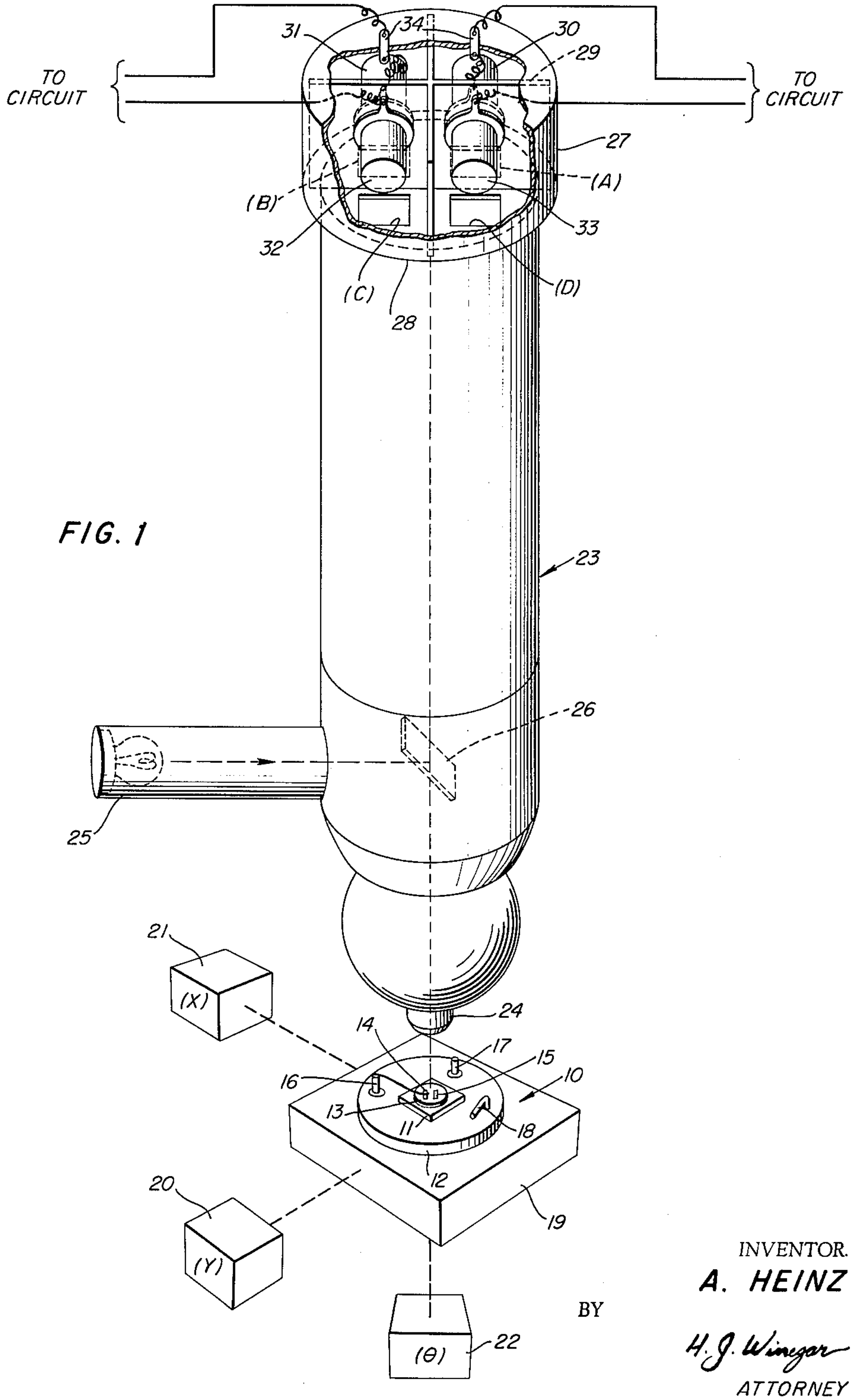
Figures 2A, 2B, 2C, 2D, 2E:
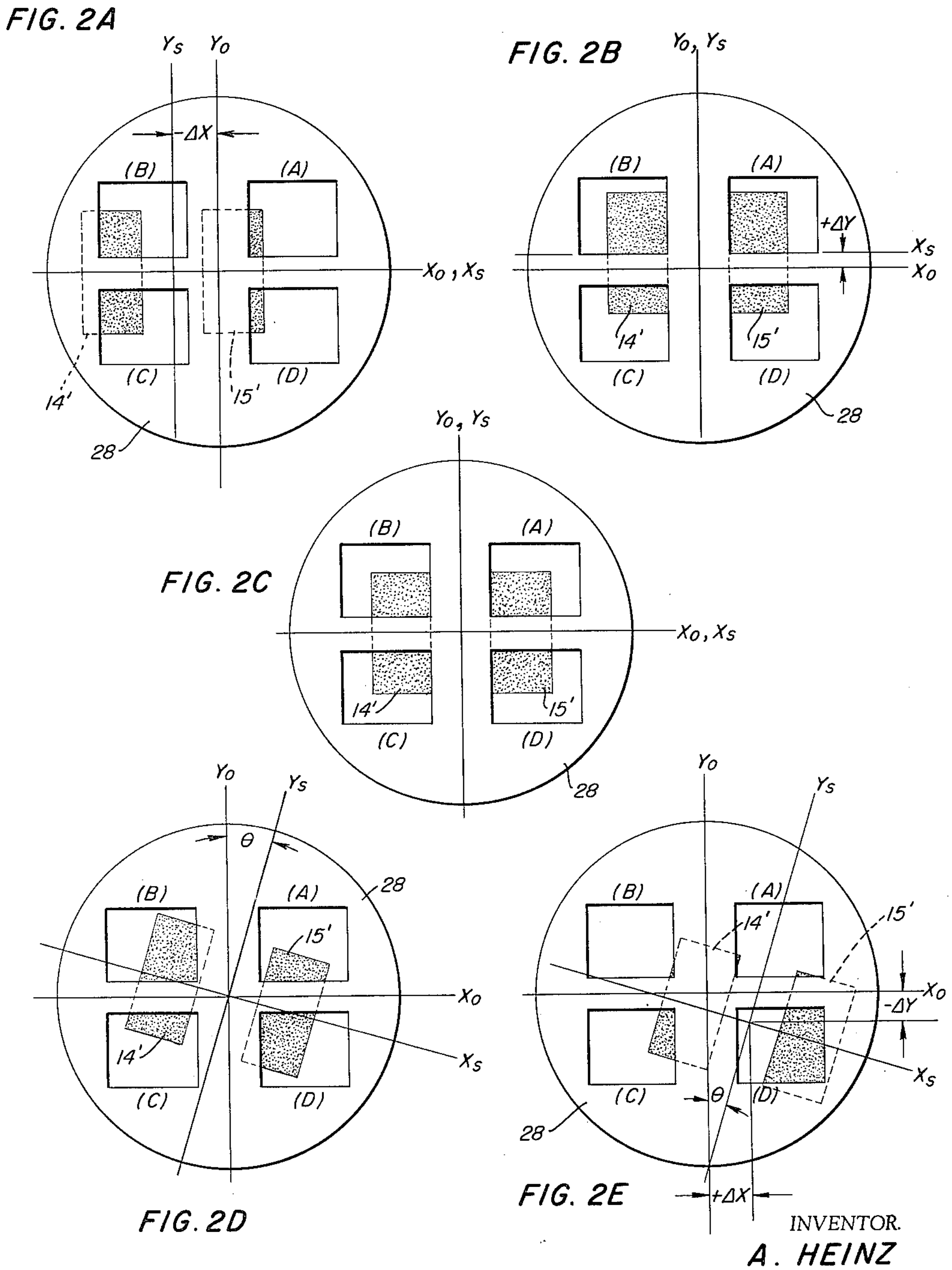
Figure 3:
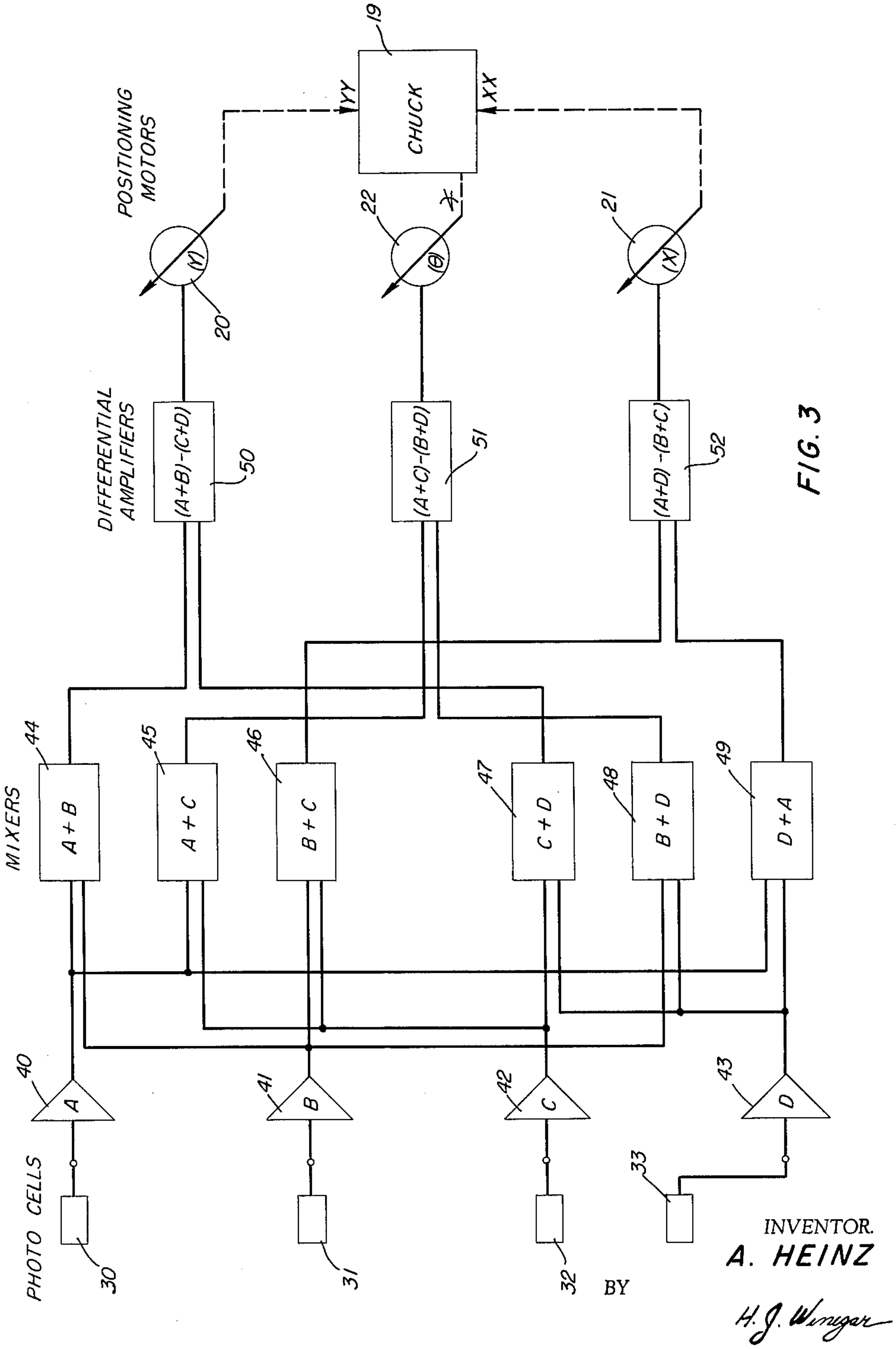

A more complete understanding of the invention may be obtained from the following detailed description of a specific embodiment thereof when read in conjunction with the drawings, in which:

FIG. 1 is a perspective view of the optical and mechanical components of an electro-optical positioning system forming a specific embodiment of the invention;

FIGS. 2A to 2E, inclusive, are enlarged images of properly and improperly positioned semiconductor contact stripes as they appear through the optical mask, and FIG. 3 is a schematic diagram of an electrical circuit for the system shown in FIG. 1.

Referring now in detail to the drawings, wherein like numerals and letters designate the same elements throughout the several views, there is shown in FIG. 1 a mesa transistor 10, which is the body to be positioned, including a semiconductor wafer 11 mounted upon a body portion 12. The wafer 11 is approximately 30 mils square and has a central mesa 13, which is a raised portion approximately 10 mils across. The mesa 13 has two aluminum contact stripes 14 and 15, each of which is about 2 x 4 mils in size and which are separated from each other by about 2 mils. The stripes 14 and 15 provide good electrical contact to the emitter and base zones of the transistor, and are substantially brighter than the wafer 11.

Each zone of the transistor must be connected to one of the external terminals 16, 17, or 18. The collector zone is connected through the body portion 12 to the terminal 18. Gold wires of less than 1 mil diameter are bonded to the stripes 14 and 15 to connect them to terminals 16 and 17. In order to facilitate the bonding of the gold wires to stripes 14 and 15, the instant invention provides a system for automatically positioning the stripes 14 and 15 with respect to a set of reference axes ($X_0$, $Y_0$, in FIG. 2) to which wire bonding facilities (for simplicity, not shown) are referenced.

In the electro-optical positioning system, the transistor 10 is held in place by a movable work stage or chuck 19 which may be translated in the X and Y directions by positioning motors 21 and 20, respectively, and rotated by positioning motor 22. The coupling of the positioning motors 20, 21 and 22 to the chuck 19 is shown only in schematic fashion in FIG. 1 since it may be accomplished in many different expeditious ways. For example, the chuck 19 and rotational positioning motor 22 could be mounted on a table movable in X direction by positioning motor 21 and then the whole assembly mounted on another table movable in the Y direction by servo motor 20.

The positioning system includes a microscope, generally designated 23, which includes an optical lense 24, a light source 25 and a reflector 26 which will reflect the light from the light source 25 to the transistor 10 but permit light reflected from the transistor 10 to pass therethrough.

At what would normally be the eye piece portion of microscope 23 there is provided a light receiving compartment 27. The compartment 27 is separated from the remainder of the microscope 23 by an optical mask 28 which has therein four rectangular apertures or windows, A, B, C and D. The compartment 27 is divided into four quadrants by walls 29, each quadrant having one of the windows A to D therein. Photoelectric elements, or photocells, 30 to 33 are mounted on the walls 29 above windows A to D respectively. Electrical connections 34 are provided from each of the photocells 30 to 33 to the electrical circuit shown in FIG. 3.

Virtually any type of photoelectric element may be used. All that is required is that the electrical condition be varied with variation in incident light. Thus photo-conductors and photo-multipliers of vacuum tube, gas filled tube or semiconductor construction are suitable. However, semiconductor devices are preferred because they may be small in size and thus they permit less magnification of the contact stripes 14 and 15. For the same reason, lead sulfide photosensitive resistors are also highly suitable.

FIG. 2C shows the optical mask 28 with the image of the stripes 14 and 15 when the stripes are properly positioned. The stripe images, designated 14' and 15', are outlined by broken lines, and the portions of the images appearing through the windows A to D are shaded. The windows A to D are symmetrically positioned in each quadrant with respect to the optical axes of the system, $X_0$ and $Y_0$. When the stripes 14 and 15 are properly positioned, the axes of the stripes $X_s$ and $Y_s$ coincide with the optical axes $X_0$ and $Y_0$.

The size, position and shaping of windows A to D depend upon the size and shape of the outer periphery of the stripe images 14' and 15' and upon the sensitivity desired in the sensing system. To obtain both translational and rotational positioning information it is necessary that the windows A to D each "see" an outer corner of the stripe images 14' and 15' when the stripes 14 and 15 are properly positioned.

With respect to sensitivity, it will be apparent that the greatest sensitivity of the system will occur when windows A to D are one-half filled by the images 14' and 15' of properly positioned stripes 14 and 15, because then a displacement of the transistor 10 will produce the largest possible signal. However, a compromise must be struck between high sensitivity and reasonable prepositioning ranges. If the optical field observed by windows A to D is not large in comparison with the body, very accurate prepositioning of the transistor 10 is essential. This results from the fact that, in order to get any positioning information, for all positions of the stripes 14 and 15, it is necessary that a portion of at least one of stripe images 14' and 15' appear under at least one of windows A to D of the optical mask 28.

As best illustrated in FIG. 3, the outputs of the photocells 30 to 33, which are proportional to the area of the stripe images 14' and 15' appearing in each of the windows A to D, respectively, are amplified in amplifiers 40 to 43. The output of each one of amplifiers 40 to 43 is then connected to three of six mixing circuits 44 to 49, each of which add one output of that amplifier to one output of each of the other three amplifiers. Thus the output of each of the mixing circuits 44 to 49 is proportional to the sum of the outputs of two of the photocells 30 to 33, taken in all possible combinations. The pairs of mixing circuits 44 and 47, 45 and 48, and 46 and 49 are in turn connected to three differential amplifiers 50, 51 and 52, respectively. Thus, the differential amplifier 50 subtracts the output of the two horizontally adjacent photocells 32 and 33 from the output of the other two horizontally adjacent photocells 30 and 34. Using the designations of the windows A to D, the output of differential amplifier 50 follows the relationship $$S_y=(S_a+S_b)-(S_c+S_d) \qquad (1)$$

where $S_y$ is, as will be shown below, the Y axis positioning signal, and $S_a \ldots S_d$ are proportional to the light passing through windows A to D.

Similarly, the outputs of differential amplifiers 51 and 52 are $$S_\theta=(S_a+S_b)-(S_c+S_d) \qquad (2)$$

where $S_\theta$ is the rotational positioning signal, and $$S_x=(S_a+S_d)-(S_b+S_c) \qquad (3)$$

where $S_x$ is the $X_\Delta$ axis positioning signal.

The signals $S_y$, $S_\theta$, $S_x$ are then fed to positioning motors 20, 22 and 21 respectively. If the positioning motors are of alternating current type, these signals may advantageously be first put through a standard D.C. and A.C. converter or chopper.

It may be noted that the amplifiers 40 to 43, the mixing circuits 44 to 49 and the differential amplifiers 50 to 52 may all be of standard designs well known in the art. For instance, Gray, "Applied Electronics" (Second Edition, New York, Wiley, 1954), pp. 503–509, describes several suitable vacuum tube differential amplifiers.

In operation then, FIG. 2C shows the stripe images 14' and 15' properly positioned, and since equal areas thereof appear under each window A to D the outputs of the photocells will be equal, i.e., $S_a=S_b=S_c=S_d$. Accordingly the outputs $S_x$, $S_y$ and $S_\theta$ of differential amplifiers 50 to 52 will be zero and there will be no input error signal to the positioning motors 20 to 22.

FIG. 2B shows the stripe images 14' and 15' properly positioned except for a translation $\Delta Y$ between the $X_s$ and $X_0$ axes. It will be apparent from inspection of the relative sizes of the stripe areas appearing through windows A to D in FIG. 2B that the sum of the light appearing through windows A and B will considerably exceed that appearing through windows C and D, and that the outputs of the photocells 30 to 33 will have the relation $$S_a=S_b,\ S_c=S_d, \text{ and } (S_a+S_b)>(S_c+S_d)$$

Accordingly, from Equations 1, 2 and 3 above, differential amplifiers 51 and 52 will produce no output $$(S_\theta=S_y=0)$$

and the differential amplifier 50 will produce a positive signal ($S_y$) indicative of the direction and, generally, the magnitude of the vertical translation, $\Delta Y$. The signal $S_y$ is then used to drive positioning motor 20, which will move the chuck 19 along the Y axes until the $X_0$ and $X_s$ axes coincide.

The manner in which horizontal positioning is obtained is essentially similar. With reference to FIG. 2A, there is shown the optical mask 28 with the stripe images 14' and 15' properly positioned except for a displacement of $\Delta X$ between the axes $Y_s$ and $Y_0$. Accordingly, the relationship between the signals obtained from the photosensitive elements is $$S_b=S_c,\ S_a=S_d, \text{ and } (S_b+S_e)>(S_a+S_d)$$

Using Equations 1, 2 and 3, the only positioning signal will be $S_x$ from differential amplifier 52. This latter signal is fed to positioning motor 21 which will move the chuck 19 in a manner so as to close the gap $\Delta X$ and move the axes $Y_0$ and $Y_x$ into coincidence.

In order to preclude a false null in signal $S_x$ the dimensions of the windows A to D parallel to the $X_0$ axis are chosen to be significantly greater than the spacing between the stripe images 14' and 15'. If the window size was not so chosen, such a false null could occur if stripe image 14' was totally to the left of window B and C, and stripe image 15' was totally in the gap between windows along the $Y_0$ axes.

With respect to rotational positioning, FIG. 2D shows the images 14' and 15', and thus the axes $X_s$ and $Y_s$, rotated through an angle $\theta$ with respect to the optical axes $X_0$, $Y_0$, but the images 14' and 15' are properly positioned translationally. The relationship between the outputs is as follows $$S_a=S_c,\ S_b=S_d, \text{ and } (S_b+S_d)>(S_a+S_c)$$

It will be apparent that from Equations 1, 2 and 3 that only differential amplifier 51 will produce a signal, $S_\theta$. Rotational positioning motor 22 will be activated. Thus the rotational positioning is dependent upon adding the signals produced by the light through the windows in two diagonally opposite quadrants, B and D, and subtracting the resultant from the sum of the signals produced by the light passing through the windows in the other two diagonally opposite quadrants, A and C.

It should be noted that for rotational positioning the summation in the mixer circuits 45 and 48 is essential, whereas in the translational positioning the summation is not essential to the operation of the system. For instance, with reference to FIG. 2B, it is possible to obtain vertical positioning by merely comparing signals $S_a$ and $S_d$ or $S_b$ and $S_c$. On the other hand, information obtained by comparing signals from only two adjacent windows, for instance, B and C or B and A, would not be suitable for rotational positioning because the resultant error signal couldn't be distinguished from a translational error signal ($S_x$ or $S_y$). However comparing, for example both $S_a$ and $S_b$ with both $S_c$ and $S_d$ provides a highly useful function in translational positioning, in that it averages the vertical positions of the stripes 14 and 15. Accordingly, if one stripe was higher along the $Y_s$ axis than the other, the final position error would be only one-half the difference. Other similar errors caused by lack of symmetry are also averaged.

FIG. 2E shows the stripe images 14' and 15' with the origin of their axes system $X_s$, $Y_s$ located in the quadrant containing window D. Accordingly, the stripes are translationally displaced both horizontally and vertically by amounts $\Delta X$ and $\Delta Y$, respectively. Further, there is a rotational displacement through an angle $\theta$. The relationships between the photocell outputs are $$(S_b+S_c)<(S_a+S_d),\ (S_a+S_b)<(S_c+S_d \text{ and } (S_b+S_d)>(S_a+S_c)$$

When these relationships are compared with Equations 1, 2 and 3, it is apparent that all three positioning motors 20, 21 and 22 will be activated at the same time, tending to bring the stripe images 14' and 15' into the orientation shown in FIG. 2C. While it is not essential to applicant's invention that rotational and translational positioning occur simultaneously, it is clearly preferred.

The positioning of the stripe images 14' and 15' in FIG. 2E demonstrates a further advantage derived from utilizing all four photocell outputs for driving each of the positioning motors 20 and 21. As was indicated above, horizontal positioning could be obtained by merely comparing the signal derived through window A with the signal derived through window B. For the position in FIG. 2E, however, this comparison yields at most a very small signal that would not be truly indicative of the size of displacement $\Delta X$. Truly representative horizontal information would have to await more accurate rotational positioning. However, since all four photocell outputs are used in this embodiment of the invention for horizontal positioning, the benefit of comparing signal $S_d$ and $S_c$ is superimposed upon the comparison $S_a$ with signal $S_b$. Differential amplifier 52 thus provides a significant output to positioning motor 21 and thereby increases the speed of response of the positioning system.

One possible modification of the above system is to substitute differential amplifiers for the mixers 44 and 49 in FIG. 3 and to substitute mixers for the differential amplifiers 50 to 52. Thus, the summing operation will follow the subtraction, and by simple algebraic manipulation of Equations 1, 2 and 3

$$S_y=(S_a-S_c)+(S_b-S_d)$$
$$S_\theta=(S_a-S_b)+(S_c-S_d)$$
$$S_x=(S_a-S_c)+(S_d-S_b)$$

Various other modifications of the above embodiment of the invention are possible. For instance, the body to be positioned could be elliptical in shape or the windows could be circular. More than one window could be provided in some or all quadrants if preliminary mixing circuits were included in the system. A bias could be provided at many places in the system, for instance, in the differential amplifier to displace the $X_s$, $Y_s$ axes system a known amount from the $X_0$, $Y_0$ axes system. In some applications of the invention, the body to be positioned may be constrained in a supply track so that translational positioning may be needed in only one dimension. Accordingly, it is to be understood that the above described embodiment of the invention is merely illustrative and that numerous modifications may be made within the spirit and scope of the invention.

What is claimed is:

1. In an electro-optical system for positioning an article in a preselected translational and rotary orientation with respect to first and second coordinate axes, the article being provided with a surface having a light reflecting characteristic contrasting with that of the article, the combination of:

means for illuminating the article to project an enlarged, reflected image of the article;

a light-receiving compartment having four windows arranged to view the projected image, said windows being symmetrically disposed one to each quadrant formed by the first and second axes such that, when the article is in said preselected orientation, light reflected from a distinct peripheral portion of the surface passes through each window;

a photoelectric element associated with each window for receiving light passing through the associated window to generate an output;

six mixing means for adding the outputs two at a time in different combinations to produce a plurality of signals;

a first differential amplifier for subtracting the signals produced by the adding means which add the outputs of the elements associated with adjacent windows positioned parallel to the first coordinate axis;

first article positioning means responsive to the output of said first differential amplifier for translating the article perpendicular to the first coordinate axis;

a second differential amplifier for subtracting the signals of the adding means which add the outputs of the elements associated with adjacent windows positioned parallel to the second coordinate axis;

second article positioning means responsive to the output of said second differential amplifier for translating the article parallel to the first coordinate axis;

a third differential amplifier for subtracting the signals of the adding means which add the outputs of the elements associated with diagonally opposite windows; and third article positioning means responsive to the output of said third differential amplifier for rotating the article around the intersection of the first and second coordinate axes.

2. In an electro-optical system for rotationally positioning a semiconductor article with respect to a coordinate axes system having four quadrants, the semiconductor article being provided with a pair of spaced contacts having a light reflecting characteristic contrasting with that of the semiconductor article, the combination of:

masking means having at least four windows, one of said windows being provided for each of said quadrants, said windows being arranged in pairs, each of said pairs including two windows positioned in diagonally opposite locations symmetrically with respect to said axes system;

means for illuminating the semiconductor article and the pair of spaced contacts to reflect light from the contacts through said windows according to the rotational position of the semiconductor article relative to said axes system;

at least four photoelectric elements, one of said elements being provided for receiving light reflected through each of said windows to produce an output, said elements being arranged in pairs, each of said pairs including two elements positioned in diagonally opposite locations to correspond to said locations of said windows;

first electrical circuit means for adding the outputs produced by each pair of diagonally opposite photoelectric elements to produce a plurality of sums;

second electrical circuit means for subtracting said sums to produce a signal indicative of the rotational position of the semiconductor article; and means responsive to said signal for rotating the semiconductor article into a preselected position relative to said coordinate axes system.

3. In an electro-optical system for rotating an article from a first orientation to a selected orientation relative to a pair of coordinate axes, said article having a first surface portion which reflects light contrasting in brightness to light reflected by a second surface portion thereof, the combination of:

means including an enclosure having a first end spaced from the article, said means being provided for illuminating the article to reflect light having contrasting brightnesses from the first and second surface portions through said first end in an optical path;

masking means mounted in said optical path at an opposite end of said housing, said masking means having two pairs of diagonally opposed light transmitting apertures for dividing the optical path into quadrants, each pair of said apertures permitting the reflected light from diagonally opposite quadrants of the optical path to pass therethrough so that, of the reflected light passing through each pair of said apertures, the proportion of light reflected from the first surface portion to that reflected from the second surface portion is indicative of the rotational orientation of the article relative to the coordinate axes;

a light sensitive electrical element mounted to the enclosure adjacent to each aperture for receiving the reflected light passing through the adjacent aperture, each of said elements operating in response to the light received for generating an output proportional to said proportion of light reflected from the first surface portion to that reflected from the second surface portion;

means for adding the outputs of diagonally opposite light sensitive elements which receive the reflected light passing through said pairs of diagonally opposite apertures to generate separate signals indicative of the position of the article relative to the selected orientation;

means responsive to the difference between the separate signals for producing an error signal proportional to the distance between the first and the selected orientations of the article; and means responsive to the error signal for rotating the article from the first orientation to the selected orientation.

4. An electro-optical system for rotating a semiconductor body from a first orientation to a second orientation relative to a coordinate axes system having four quadrants, the semiconductor body having a pair of spaced contacts thereon which reflect light contrasting in brightness to light reflected by the semiconductor body, said system comprising:

means for illuminating the body to reflect therefrom an image of the body;

a light receiving compartment having four windows arranged to view the reflected image, said windows being positioned one to each quadrant symmetrically with respect to the axes system so that when the body is in the second orientation the windows pass symmetrical portions of the image, pairs of said windows being positioned in diagonally opposite quadrants;

a photoelectric element associated with each window for receiving reflected light passing through the associated window to generate an output signal;

two mixing means for adding the output signals generated in response to the portions of the image passing through the pairs of diagonally opposite windows to produce a pair of sum signals;

a differential amplifier for subtracting the sum signals to generate an error signal indicative of positioning of the body in the first orientation; and positioning means responsive to the error signal for rotating the body to the second orientation.

5. A positioning system in accordance with claim 1, wherein the surface of the article comprises a pair of adjacent rectangular stripes on the article, wherein said windows are rectangular in shape, and the dimensions of said windows in the direction of the second axis exceed the distance between the projected images of the stripes.

6. In an electro-optical system for rotationally and translationally positioning a semiconductor body with respect to a coordinate axes system having four quadrants defined by horizontal and vertical axes of the coordinate axes system, said semiconductor body being provided with a pair of spaced contacts having light reflecting characteristics contrasting from that of the semiconductor body, the combination of:

masking means having at least four windows, one of said windows provided for each of the quadrants, said windows being positioned in pairs comprising diagonally opposite windows, horizontally adjacent windows, and vertically adjacent windows;

means for illuminating the semiconductor body and the pair of spaced contacts to reflect light from the contacts through said windows according to the rotational and translational position of the semiconductor body relative to the axes system;

at least four photoelectric elements, one of said elements being provided for receiving light reflected through each of said windows to produce an output, said elements being positioned in pairs comprising diagonally opposite elements, horizontally adjacent elements, and vertically adjacent elements located to correspond to the positions of correspondingly positioned windows;

first electrical circuit means for adding the outputs produced by each pair of diagonally opposite photoelectric elements to produce a pair of rotational positioning sums;

second electrical circuit means for adding the outputs produced by each pair of vertically adjacent photoelectric elements to produce a pair of horizontal positioning sums;

third electrical circuit means for adding the outputs produced by each pair of horizontally adjacent photoelectric elements to produce a pair of vertical positioning sums;

electrical circuit means for subtracting the pairs of rotational positioning, horizontal positoning, and vertical positioning sums to produce three signals indicative of the respective rotational, horizontal, and vertical positions of the semiconductor body; and means responsive to said three signals for rotating and translating said semiconductor body into a preselected rotational and translational position relative to the coordinate axes system.

7. In a system for positioning an article relative to a pair of coordinate axes, said article being provided with a first area having a first light reflecting characteristic differing from a second light reflecting characteristic of a second area of said article, the combination of:

means for mounting the article for translational movement parallel to each of the coordinate axes and for rotary movement on an axis of rotation defined by the intersection of the coordinate axes;

means for illuminating the first and second areas of the article to reflect therefrom first and second light beams having first and second intensities according to the first and second light reflecting characteristics of the article;

masking means for forming said first and second reflected light beams into four separate quadrant portions to form four pairs of adjacent quadrant portions and two pairs of diagonally opposite quadrant portions;

four individual light sensitive elements, each of said elements being responsive to a different quadrant portion of the first reflected light beam for generating an output signal;

means for adding the output signals generated by the light sensitive elements responsive to the four pairs of adjacent quadrant portions and to the two pairs of diagonally opposite quadrant portions of the first reflected light beam to produce six position signals when the article is displaced from the respective coordinate axes and said axis of rotation;

first differential means for subtracting two position signals produced by the adding means in response to the output signals of the elements responsive to the pairs of adjacent quadrant portions that are parallel to a first of the coordinate axes;

first article positioning means responsive to the output of said first differential means for actuating the mounting means to translate the article perpendicular to the first coordinate axis;

second differential means operable simultaneously with operation of said first differential means for subtracting the two position signals produced by the adding means in response to the output signals of the elements responsive to the pairs of the adjacent quadrant portions that are parallel to a second of the coordinate axes;

second article positioning means responsive to the output of said second differential means for actuating the mounting means to translate the article parallel to the first coordinate axis;

third differential means operable simultaneously with said first and second differential means for subtracting the two position signals produced by the adding means in response to the output signals of the elements responsive to the two pairs of diagonally opposite quadrant portions; and third article positioning means responsive to the output of said third differential means for actuating the mounting means to rotate the article on said axis of rotation.

References Cited by the Examiner

UNITED STATES PATENTS

| | | | |
|---|---|---|---|
| 2,220,491 | 11/40 | Petz et al. | 88—14 |
| 2,507,781 | 5/50 | Glass | 250—220 X |
| 2,952,779 | 9/60 | Talley | 250—220 X |
| 2,969,018 | 1/61 | Erst et al. | 250—220 X |
| 3,038,369 | 6/62 | Davis | 250—232 X |

RALPH G. NILSON, *Primary Examiner.*

UNITED STATES PATENT OFFICE
CERTIFICATE OF CORRECTION

Patent No. 3,207,904

September 21, 1965

Alfred Heinz

It is hereby certified that error appears in the above numbered patent requiring correction and that the said Letters Patent should read as corrected below.

Column 3, line 54, equation (2) should appear as shown below instead of as in the patent:

$$S_\theta = (S_a + S_c) - (S_b + S_d)$$

Signed and sealed this 17th day of May 1966.

(SEAL)
Attest:

ERNEST W. SWIDER
Attesting Officer

EDWARD J. BRENNER
Commissioner of Patents